(12) United States Patent
Donaway et al.

(10) Patent No.: US 6,547,255 B1
(45) Date of Patent: Apr. 15, 2003

(54) FLUID SEALS

(75) Inventors: Peter Donaway, Powys (GB); Daniel Iwan Jones, Powys (GB)

(73) Assignee: Pamargan Products Limited, Newtown (GB)

( * ) Notice: Subject to any disclaimer, the term of this patent is extended or adjusted under 35 U.S.C. 154(b) by 0 days.

(21) Appl. No.: 09/680,002

(22) Filed: Oct. 5, 2000

(30) Foreign Application Priority Data

Oct. 5, 1999 (GB) .............................................. 9923437
Jul. 18, 2000 (GB) .............................................. 0017455

(51) Int. Cl.⁷ ........................ F16L 17/00; F16L 17/025; F16J 15/08; B01D 35/00
(52) U.S. Cl. ...................... 277/602; 277/626; 277/650; 277/918; 210/455; 210/445
(58) Field of Search ................... 277/650, 918, 277/627, 637, 638, 639, 644, 314, 602, 626; 210/445, 450, 495, 499

(56) References Cited

U.S. PATENT DOCUMENTS

| | | | | |
|---|---|---|---|---|
| 282,093 A | * | 7/1883 | Kribs | 210/238 |
| 1,236,100 A | * | 8/1917 | Nance | 166/229 |
| 1,329,398 A | * | 2/1920 | Hachmann | 210/445 |
| 2,015,087 A | * | 9/1935 | Rafton | 101/127.1 |
| 3,206,216 A | * | 9/1965 | Crook | 210/450 |
| 3,622,008 A | * | 11/1971 | Mucci et al. | 210/355 |
| 3,707,832 A | | 1/1973 | Muller et al. | |
| 3,877,895 A | * | 4/1975 | Wonderland et al. | 138/41 |
| 4,379,051 A | * | 4/1983 | Hiesinger et al. | 210/193 |
| 4,664,800 A | * | 5/1987 | Raines et al. | 210/445 |
| 5,456,475 A | * | 10/1995 | Abraham et al. | 277/563 |
| 5,599,446 A | * | 2/1997 | Junker et al. | 210/230 |
| 5,722,456 A | * | 3/1998 | Schumacher et al. | 137/550 |
| 5,758,882 A | * | 6/1998 | Torazewski | 277/608 |

FOREIGN PATENT DOCUMENTS

| | | | |
|---|---|---|---|
| DE | 1222892 | * | 8/1966 |
| GB | 0904293 | | 8/1962 |
| GB | 1303302 | | 1/1973 |
| GB | 2223423 | | 4/1990 |
| JP | 361181508 A | * | 8/1986 |
| JP | 407144106 A | * | 6/1995 |

* cited by examiner

Primary Examiner—Anthony Knight
Assistant Examiner—Vishal Patel
(74) Attorney, Agent, or Firm—Baker Botts LLP (57) ABSTRACT

A fluid seal for sealing a joint between two components in a fluid line has an integral filter. The seal has sealing portions on each side of the filter that are compressed by relative axial movement of the components to effect a fluid-tight seal therebetween with the filter extending across the fluid line. The seal and filter are located in a central hole of a support plate with the seal bonded to the marginal edge of the hole.

13 Claims, 7 Drawing Sheets

FLUID SEALS

BACKGROUND OF THE INVENTION

This invention concerns improvements in or relating to fluid seals. The invention has particular, but not exclusive application to fluid seals for sealing joints between two components connected together in a fluid line, for example between two pipes, or between a pipe and another fitting or between two fittings such as a hydraulic block to which one or more parts may be attached, for example a pump or valve application.

It is already well known in the water and automotive industries to provide sealing rings for sealing joints between two components in a fluid line. The sealing rings may be made of rubber or plastics compatible with the fluid to be transmitted in the fluid line, for example water, oil, petrol, solvents.

For many applications, it is desirable to remove any solid particles present in the fluid to prevent damage to equipment connected to the fluid line. For this purpose, it is common to fit a filter in the fluid line, for example a metal or plastics mesh screen having a mesh rating to remove solid particles above a given size.

For convenience, the mesh screen may be fitted at a joint between two components in the fluid line. This can complicate the provision of an adequate seal. In addition, fitting separate seal and filter elements adds to material costs and installation costs. Also, there is a risk of joints being assembled without the filter resulting in damage to equipment connected in the fluid line.

SUMMARY OF THE INVENTION

Accordingly, the present invention seeks to provide an arrangement whereby the seal and filter are combined in a single component for installation in a fluid line.

It is a preferred object of the present invention to provide an arrangement in which a peripheral edge region of the filter is embedded in the seal, and the seal is compressible on either side of the filter between opposed surfaces of relatively axially movable components to effect a fluid tight seal between the components.

It is another preferred object of the present invention to provide an arrangement in which compression of the seal is controlled so as to maintain integrity of the seal and filter.

It is a further preferred object of the present invention to provide an assembly including an adaptor so constructed that fitment and installation of the seal and filter in a fluid line can be effected in a simple and effective manner which preferably also allows access to the filter for cleaning, repair or replacement during routine maintenance and/or in an emergency.

It is yet another preferred object of the present invention to provide such assembly in which the seal and filter are located with the filter in a desired orientation, preferably transverse, to the fluid line in which the adaptor is installed.

According to a first aspect, the present invention provides a solution to the problems and disadvantages aforementioned by providing an integral seal and filter assembly capable of sealing a joint between two components in a fluid line and filtering fluid in the fluid line. In this way, by combining the seal and filter in a single unitary construction the supply and installation of separate seal and filter elements is avoided.

The combined seal and filter can be of any size and shape to suit a given application, for example circular, oval, rectangular, or other polygonal shape. As will be appreciated, by providing an integral seal and filter, the filter can be made to any shape and the seal configured to this shape by attaching to the filter. In this way, both simple and complex seal shapes can be produced and maintained for any desired application.

Preferably, the seal is bonded to the peripheral edge of the filter. For example, the filter may comprise a mesh screen with the peripheral edge embedded in the seal. In this way, the material of the seal penetrates the interstices of the mesh so as to become mechanically bonded through the mesh.

The mesh screen may be made of metal, for example stainless steel, aluminium or brass. Alternatively, the mesh screen may be made of plastics. The mesh can be of any size for the filter rating required for a particular application.

The seal may be made of elastomer, for example rubber such as nitrite rubber, hydrogenated nitrite rubber, ethylene propylene diene monomer, fluorocarbons, polyacrylic, neoprene, fluorosilicon, or other suitable compounds for the intended application. Alternatively, the seal may be made of plastics. The seal material is chosen to be compatible with the fluid in the fluid line.

Advantageously, the mesh is provided with a barrier spaced from the peripheral edge to restrict flow of the seal material from the peripheral edge region towards the centre region of the mesh. In this way, only the peripheral edge region is embedded in the seal material and the centre region is left free to provide the filtering function.

The mesh may be woven and the barrier formed by crushing a narrow region of the mesh inwardly of the peripheral edge prior to or during moulding of the seal to form a crease separating the edge region of the mesh from the centre region to prevent the seal material penetrating the centre region of the filter. This is found to be particularly suitable for woven meshes having a mesh size of up to 200 microns.

Alternatively, the mesh may be produced by photochemical machining an array of perforations in a pre-form and the barrier formed by masking the pre-form to produce a region free from perforations separating the edge region of the mesh from the centre region to prevent the seal material penetrating the centre region of the filter. This is found to be particularly suitable for photofabrication of meshes having a mesh size of more than 200 microns, especially 300 to 400 microns.

Preferably, the seal is formed with a plurality of outwardly projecting lobes spaced apart around the outer edge of the seal and substantially co-planar with the seal and filter. The lobes facilitate moulding the seal onto the filter by allowing the seal material to pass from one side to the other around the outer edge of the filter within the mould. The lobes also act as spacers to centre the seal and filter assembly for installation in a fluid line, for example in a counterbore of a component forming part of the fluid line.

Advantageously, the seal has a sealing portion of generally trapezoidal cross-section with a maximum axial dimension at the inner edge of the seal and sealing surfaces that extend from the inner edge and converge towards each other. In this way, the inner edge of the seal has a substantially planar sectional shape in the undeformed condition of the seal and a substantially concave sectional shape when compressed. As a result, compression of the seal can be accommodated without adversely affecting the integrity of the seal and filter.

The filter provides a degree of reinforcement for the seal which is generally sufficient for most applications of the seal and filter assembly involving low fluid pressures but, at high fluid pressures, for example up to 200 bar, the seal and filter assembly is preferably provided with additional reinforcement. Such reinforcement conveniently takes the form of an outer support member, for example a plate, to which the seal is bonded to form a unitary construction.

Advantageously, the plate has a hole with a counterbore providing a shoulder for locating the peripheral edge of the filter with the seal encapsulating the peripheral edge and bonded to the marginal edge of the hole.

Preferably, the seal projects outwardly from the plate on both sides for sealing engagement with the components of the joint to be sealed. The plate may act as a spacer to limit the compression of the seal. The plate may be made of metal, for example zinc plated steel or stainless steel. Alternatively, the plate may be made of plastics, for example polycarbonate.

According to a second aspect, the present invention provides a method of forming a seal and filter assembly comprising providing a filter and bonding a seal to the marginal edge of the filter.

Preferably, the seal is confined to the marginal edge of the filter by providing the filter with a barrier prior to or during moulding of the seal onto the filter.

Advantageously, the seal is bonded to the marginal edge of a hole in an outer support member which may act as a spacer to control compression of the seal.

Preferably, the seal has a sealing portion of trapezoidal section inwardly of the hole with sealing surfaces projecting from the support member on each side and convergent from an inner edge of the seal towards the support member.

According to a third aspect, the present invention provides a method of forming a fluid tight joint between first and second components in a fluid line comprising providing an integral seal and filter element, positioning the element with the seal between opposed faces of the first and components and the filter extending across the fluid line, and relatively moving the first and second components in an axial direction to compress the seal between the opposed faces on each side of the filter.

The two components may be pipes having opposed end flanges with the seal arranged between the flanges so as to be compressed when the flanges are urged axially towards each other to provide a fluid tight joint for liquid and/or gas. One of the flanges may have a recess in the end face in which the seal is positioned to limit compression of the seal. Alternatively, one of the components may be a pipe and the other component a fitting to which the pipe is attached. Other arrangements are possible, for example a block for one or more fluid lines to which fittings are attached, for example a pump or valve, with the seal arranged between the block and the fitting.

In a preferred arrangement, the components comprise first and second threadably engageable parts of an adaptor defining a passageway for flow of fluid through the adaptor wherein the seal is disposed between opposed abutment faces of the first and second parts, and the filter is located transverse to the passageway.

According to a fourth aspect, the present invention provides an assembly for mounting in a fluid line, the assembly including an adaptor having first and second parts releasably connectable to define a passageway for flow of fluid therethrough, a filter, and a seal integral with a marginal edge of the filter, the seal being arranged to contact opposed abutment faces of the first and second parts on each side of the filter and being compressed therebetween when the first and second parts are connected to seal the filter in the adaptor with the filter extending across the passageway.

Preferably, the first and second parts have co-operating screw threads arranged for relative axial movement of the first and second parts to urge the abutment faces axially towards each other to compress the seal therebetween in the assembled adaptor. In a preferred arrangement, the first and second parts are provided with complementary internal and external screw threads on a socket portion of a female fitting and a plug portion of a male fitting.

Advantageously, one of the abutment faces is provided by the recess in which the filter and seal are located and retained in the assembled adaptor so that the filter is positioned transverse to the passageway. In this way, compression of the seal may be controlled by the depth of the recess.

Preferably, the filter and seal are mounted in a support member, such as a plate, which is received in the recess and is preferably arranged to limit compression of the seal between the abutment faces when the parts are tightened during assembly of the adaptor. For example, the depth of the recess may be less than the thickness of the support member so that the support member projects from the recess and is clamped between the abutment faces in the assembled adaptor.

Advantageously, the support member has a hole with a counterbore providing a shoulder for locating the peripheral edge of the filter with the seal encapsulating the peripheral edge and bonded to the marginal edge of the hole.

Preferably, the support member has a plurality of notches formed in the marginal edge of the hole and projecting beyond the outer edge of the filter to allow the seal material to pass around the outer edge of the filter and form a plurality of lobes spaced part around the outer edge of the seal.

Advantageously, the support, member has generally parallel upper and lower surfaces and the seal has an inner portion that projects from the upper and lower surfaces of the support member and an outer portion substantially co-planar with or set back from the upper and lower surfaces of the support member. In a preferred construction, the inner portion is of generally trapezoidal section having a wider end at the inner edge and sealing surfaces converging to a narrower end at or adjacent to the support member.

Other features, benefits and advantages of the invention will be apparent to those skilled in the art from the description hereinafter illustrating, without limitation or restriction, various aspects of the invention.

BRIEF DESCRIPTION OF THE DRAWINGS

Exemplary embodiments of the invention will now be described with reference to the accompanying drawings wherein.

DETAILED DESCRIPTION OF THE EXEMPLARY EMBODIMENTS

In the following description of exemplary embodiments of the invention, like reference numerals are used throughout to indicate the same or similar parts in each embodiment.

Figure 1:
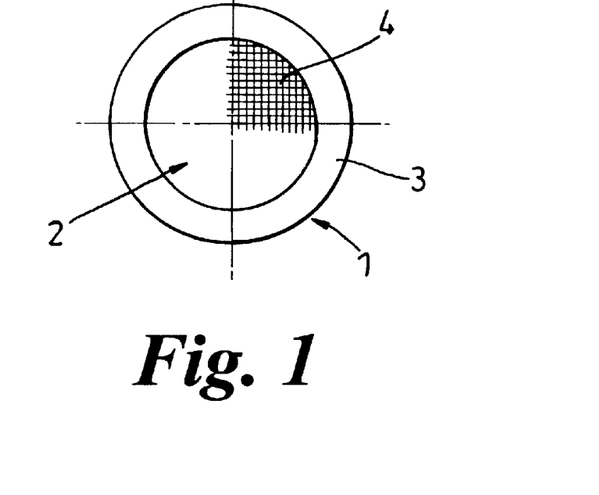
FIG. 1 is an end view of a combined seal and filter according to a first embodiment of the invention.

Referring first to FIG. 1, there is shown a first embodiment of combined seal 1 and filter 2 comprising a seal ring 3 and a wire mesh screen 4.

The seal ring 3 is made of rubber or any other suitable elastomer for the intended application moulded directly onto the peripheral edge region of the screen 4. In this embodiment, the seal ring 3 is an O-ring of circular cross-section but this is not essential and other cross-sections may be employed, for example oval, rectangular, trapezoidal.

The screen 4 is made of metal, for example stainless steel or brass, and has a mesh size for the intended application. The screen 4 is embedded around the peripheral edge region in the elastomer of the seal ring 3 by locating in a mould cavity and injecting rubber into the cavity. In this embodiment, the filter 2 is formed by blanking out the mesh screen 4 from a flat sheet of woven mesh.

The mesh is crushed over a narrow area inside the peripheral edge region covered by the seal ring 3 so as to form a crease line (not shown) blocking the interstices and preventing the elastomer flowing into the central region of the screen 4 serving as the filter 2. The crease line may be formed prior to or during moulding of the seal ring 3 onto the screen 4.

The elastomer of the seal ring 3 flows into and through the interstices of the mesh 4 in the peripheral edge region so as to bond to the mesh forming a unitary construction in which the seal 1 and filter 2 are integral.

As will be appreciated the seal ring 3 is reinforced and supported by the peripheral edge region of the mesh screen 4 which is embedded in the seal ring 3. In this way, the sealing capability of the seal ring 3 is enhanced.

Figure 2:
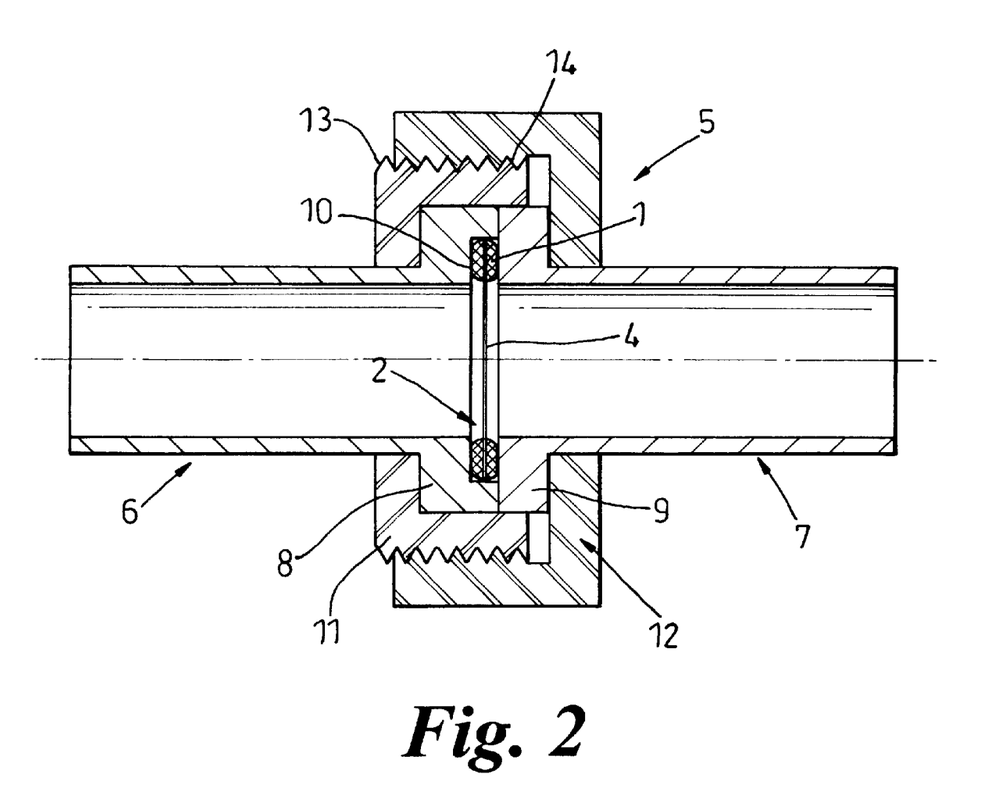
FIG. 2 is a section of a joint incorporating the seal and filter of FIG. 1.

Referring now to FIG. 2, there is shown a joint 5 between two pipes 6,7 in a fluid line, for example a water supply line for drinking water, cooling systems etc.

Each pipe 6,7 has an external flange 8,9 respectively. An end face of one flange 8 is formed with an annular recess 10 in which the combined seal 1 and filter 2 is located. The face of the other flange 9 is flat. The depth of the recess 10 is less than the diameter of the seal ring 3. As a result, the seal ring 3 projects from the recess 10 and is compressed when the end faces of the flanges 8,9 are drawn together by clamping means to provide a fluid-tight seal between the flanges 8,9.

The clamping means comprises a pair of rings 11,12 that fit over the pipes 6,7 respectively and seat against the flanges 8, 9 respectively. One of the rings 11 has an external screw threaded portion 13 and the other ring 12 has an internal screw threaded portion 14. The screw-threaded portions 13,14 are engageable so that tightening the outer ring 12 on the inner ring 11 urges the pipes 6,7 towards each other to compress the seal ring 3 to seal the joint 5. The depth of the recess 10 limits the compression of the seal ring 3 and the mesh screen 4 extends across the passageway through the pipes 6,7 so that solid particles contained in a fluid flowing through the passageway of a size that exceeds the mesh rating are removed.

Figure 3:
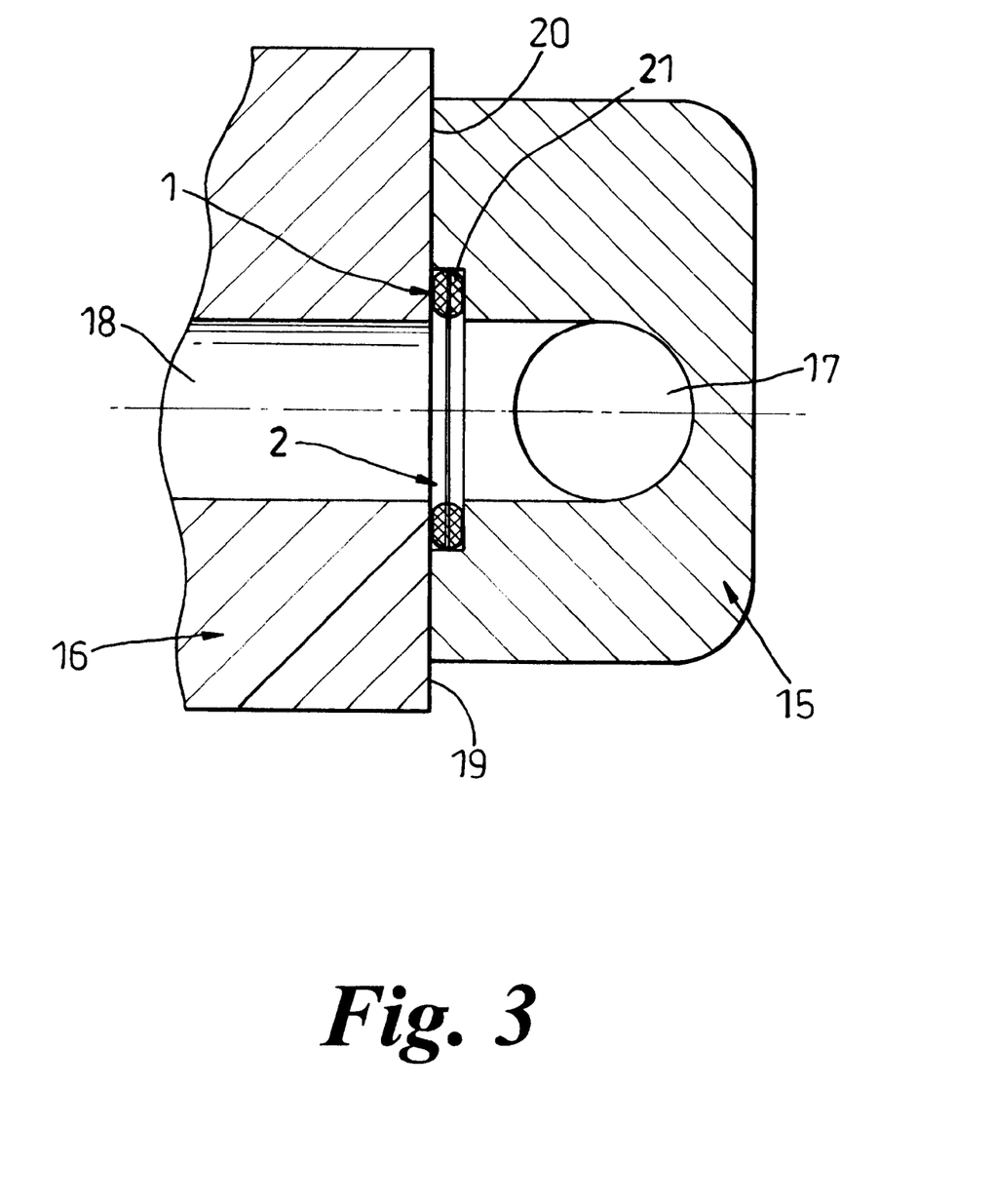
FIG. 3 is a section of an alternative joint incorporating the seal and filter of FIG. 1.

Referring now to FIG. 3, there is shown an alternative application of the combined seal 1 and filter 2 for sealing a valve body 15 to a block 16, for example in hydraulic units. The body 15 may be secured to the block 16 by any suitable means such as threaded bolts (not shown) engaging tapped holes (not shown) in the block 16 to connect respective bores 17,18 in the body 15 and block 16.

As shown, the block 16 has a planar mounting surface 19 and the body 15 has an attachment surface 20 with a recess 21 in which the combined seal 1 and filter 2 is located. The depth of the recess 21 is such that the seal ring 3 is compressed in a controlled manner to seal the joint between the body 15 and block 16. The filter 2 extends across the passageway formed by the bores 17,18 through the body 15 and block 16 so that solid particles contained in a fluid flowing through the passageway of a size that exceeds the mesh rating are removed.

As will be appreciated, combining the seal 1 and filter 2 in a single component reduces from two to one the number of components to be purchased and installed with potential savings in both material costs and installation costs. Furthermore, removal of the combined seal 1 and filter 2 for cleaning, repair and replacement is facilitated offering additional potential savings in maintenance costs.

The combined seal 1 and filter 2 above-described is suitable for applications in which the fluid pressure is less than 25 bar. At higher pressures, there is a risk of the seat 1 and filter 2 deforming sufficiently for the seal 1 to extrude itself out of the gap in which it is located between the two components forming the joint to be sealed. Furthermore, as can be seen in FIGS. 2 and 3, the seal ring 3 is flattened under compression causing the elastomeric material to bulge at the centre where the seal ring 3 is attached to the mesh 4. This may cause the seal ring 3 to tear away from the mesh 4 compromising the integrity of the bond therebetween.

Figures 4, 5, 6:
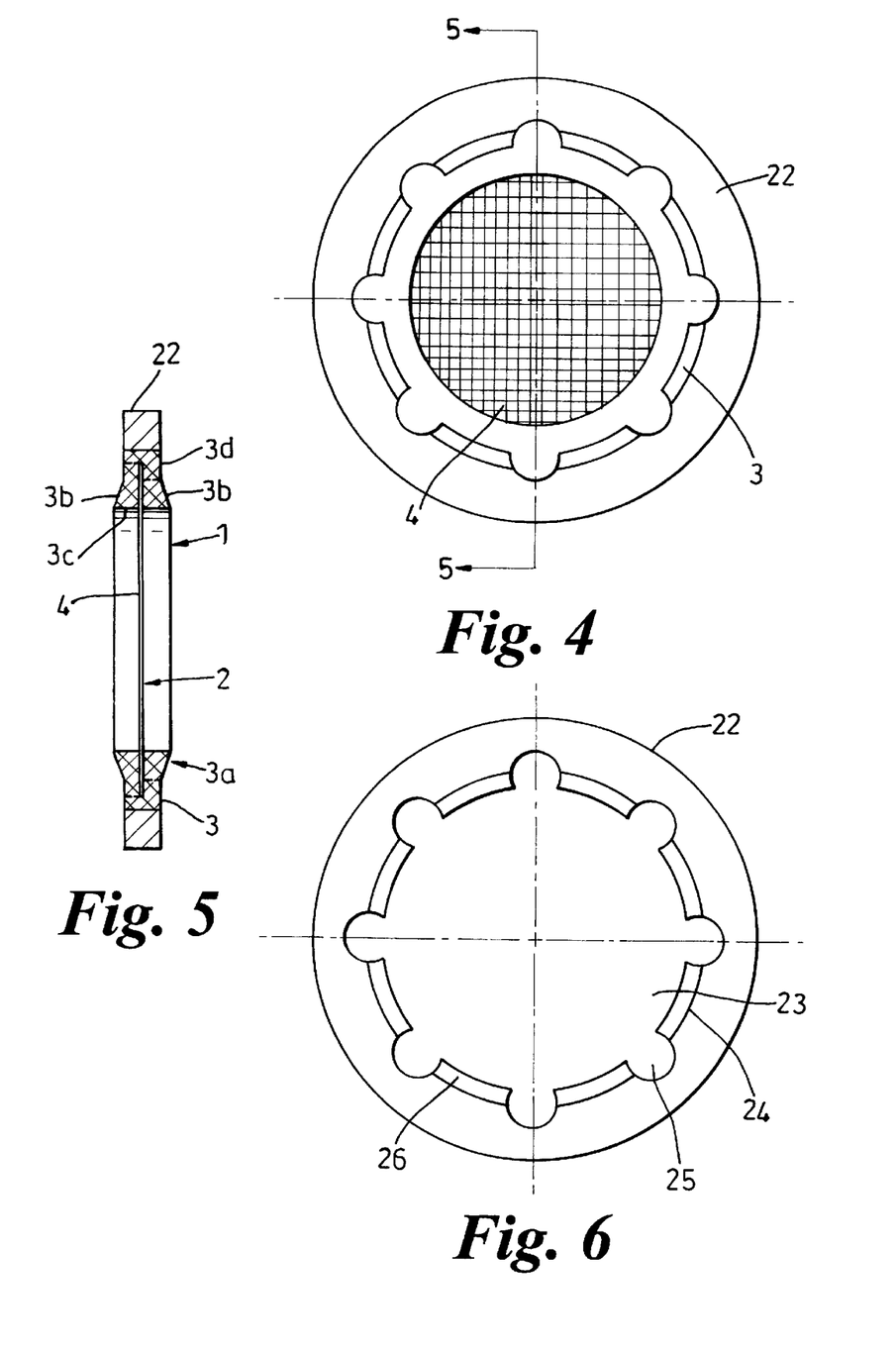
FIG. 4 is an end view of a combined seal and filter according to a second embodiment of the invention.
FIG. 5 is a section on the line 5—5 of FIG. 4.
FIG. 6 is an end view of the support member shown in FIGS. 4 and 5.

Referring now to FIGS. 4 to 6, there is shown a second embodiment of combined seal 1 and filter 2 which is capable of withstanding higher fluid pressures and which can accommodate compression of the seal 1 without compromising the integrity of the bond therebetween.

In this embodiment, the seal 1 and filter 2 is supported by means of an external support member comprising a flat, annular plate 22 to prevent the seal 1 extruding itself out of the gap between the two components of the joint. The plate 22 is made of metal, for example stainless steel or brass, by pressing, stamping or punching from metal sheet of the appropriate thickness for the intended application. It will be understood however, that this is not essential and that the plate 22 may be made of other materials including plastics depending on the intended application.

The plate 22 has a central hole 23 with a counterbore 24 on one side and a plurality of notches 25 formed in the marginal edge. The counterbore 24 terminates in an abutment shoulder 26 and the notches 25 extend outwards beyond the counterbore 24 for a purpose described later herein.

The filter 2 is made of metal by blanking out a circular mesh screen 4 from a sheet of woven mesh having the required mesh size for the intended application. The mesh screen 4 has a diameter sized to fit in the counterbore 24 with the outer peripheral edge seated on the shoulder 26.

The seal 1 comprises a seal ring 3 made of rubber or other elastomer suitable for the intended application that is moulded onto the peripheral edge region of the mesh screen 4 within the hole 23 and bonds to the support plate 22 to form a unitary construction.

As in the first embodiment, a narrow area of the mesh screen 4 spaced from the outer peripheral edge is crushed to form a crease line (not shown) blocking the interstices prior to or during moulding of the seal ring 3 to prevent the elastomer penetrating the central region of the screen 4 forming the filter 2.

The notches 25 in the marginal edge of the hole 23 allow the elastomer to flow freely around the outer peripheral edge of the mesh screen 4 to form the seal ring 3 on both sides of the mesh screen 4. This is of particular benefit when the mesh size is small.

In this embodiment, there are eight notches 25 uniformly spaced in the circumferential direction but it will be understood that the number and arrangement of notches 25 may be varied from that shown. An even number of notches, for example 2,4,6,8 etc., arranged in pairs is preferred but this is not essential and one or more notches may be employed.

The elastomer is allowed to cure in the mould and then the mould is opened to remove the plate 22 with the seal ring 3 bonded to the marginal edge of the hole 23 and the outer peripheral edge of mesh screen 4 embedded in the seal ring 3. Bonding of the seal ring 3 may be assisted by the application of chemical bonding agents to the surfaces of the plate 22 and/or mesh screen 4.

As shown, the seal ring 3 has an inner portion 3a of generally trapezoidal cross-section with sealing portions 3b projecting axially outwardly from the plate 22 on each side. The seal ring 3 has a maximum axial dimension at the inner peripheral edge 3c and the sealing portions 3b converge from the inner peripheral edge 3c and merge with an outer portion 3d which is substantially coplanar with the plate 22.

Figure 7:
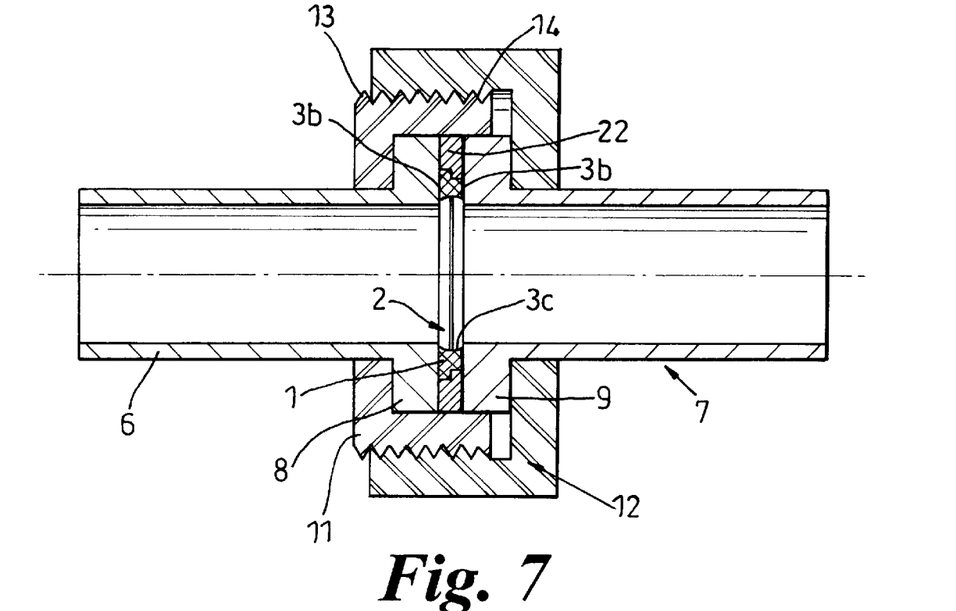
FIG. 7 is a section of a joint similar to FIG. 2 incorporating the seal and filter of FIGS. 4 and 5.
Figure 8:
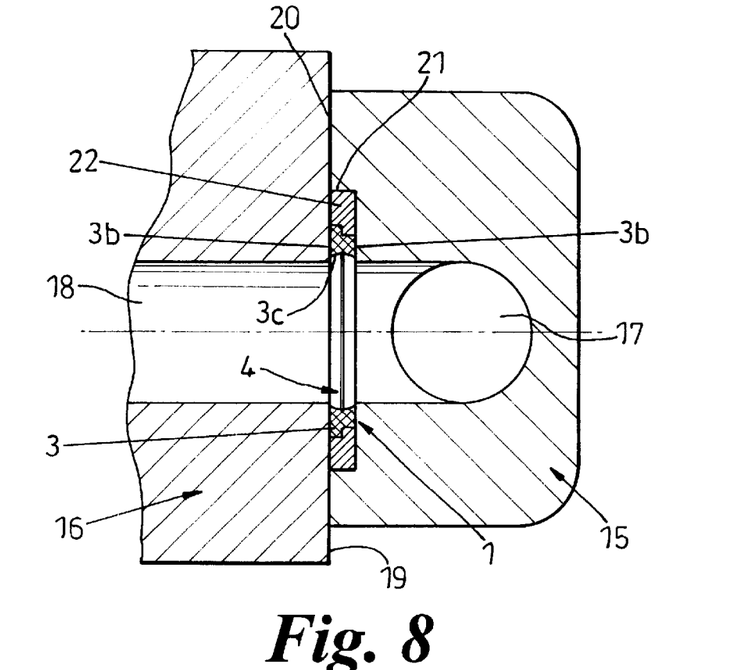
FIG. 8 is a section of a joint similar to FIG. 3 incorporating the seal and filter of FIGS. 4 and 5.

FIGS. 7 and 8 show the application of the reinforced seal 1 and filter 2 of FIGS. 4 to 6 for sealing the joints between two pipes 6,7 (FIG. 7) and between a valve body 15 and a block 16 (FIG. 8) similar to the arrangements shown in FIGS. 2 and 3.

As shown in FIG. 7, the seal 1 and plate 22 are positioned between planar end faces of the flanges 8,9 and the plate 22 acts as a spacer to limit compression of the sealing portions 3b of the seal 1 to seal the joint between the pipes 6,7 when the clamping rings 11,12 are tightened to urge the flanges 8,9 towards each other, The diameter of the plate 22 is similar to the diameter of the flanges 8,9 so that the seal 1 and filter 2 is centred between the flanges 8,9 by the inner clamping ring 11. Alternatively, the plate 22 could be of smaller diameter received in a recess in an end face of one of the flanges 8,9.

As shown in FIG. 8, the valve body 15 has a recess 21 sized to receive the plate 22 and of a depth substantially the same as the thickness of the plate 22 so that the sealing portions 3b of the seal 1 are compressed to seal the joint when the body 15 is secured to the block 16.

As will be appreciated, securing the seal ring 3 to the plate 22 reinforces the seal ring 3 thereby enabling the seal 1 to withstand substantially higher pressures without extruding out of the area between the two components of the joint to be sealed.

Furthermore, as can be seen from FIGS. 7 and 8, the trapezoidal shape of the inner portion 3a of the seal with maximum axial dimension at the inner edge 3c is such that, under compression, the elastomeric material of the sealing portions 3b is deflected inwardly causing the inner edge 3c of the seal ring 3 to adopt a concave profile. This movement of the elastomeric material occurs mainly at the tip regions of the sealing portions 3b with the result that there is no appreciable movement of the elastomeric material where the seal ring 3 is connected to the mesh screen 4. As a consequence, it has been found that the integrity of the bond between the seal ring 3 and mesh screen 4 is substantially unaffected by compression of the seal 1.

Figure 9:
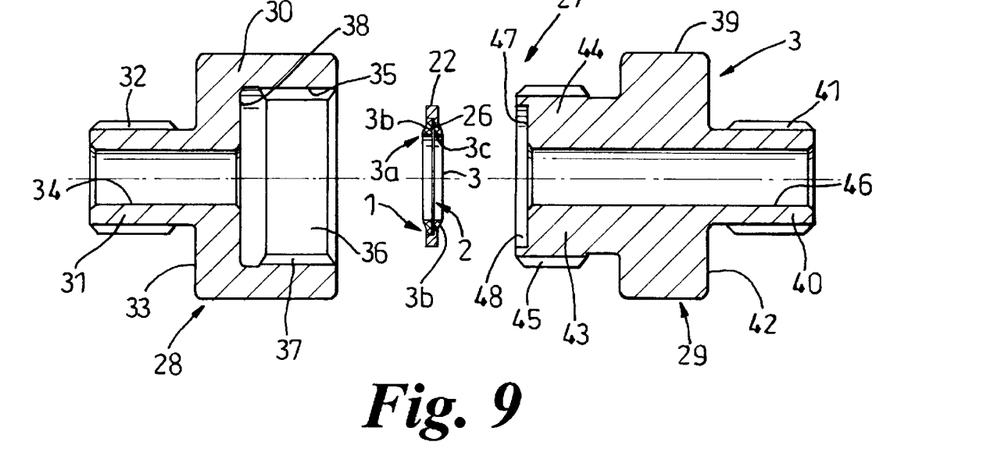
FIG. 9 is an exploded longitudinal sectional view of an adaptor assembly including the second embodiment of seal and filter shown in FIGS. 4 to 6.
Figure 10:
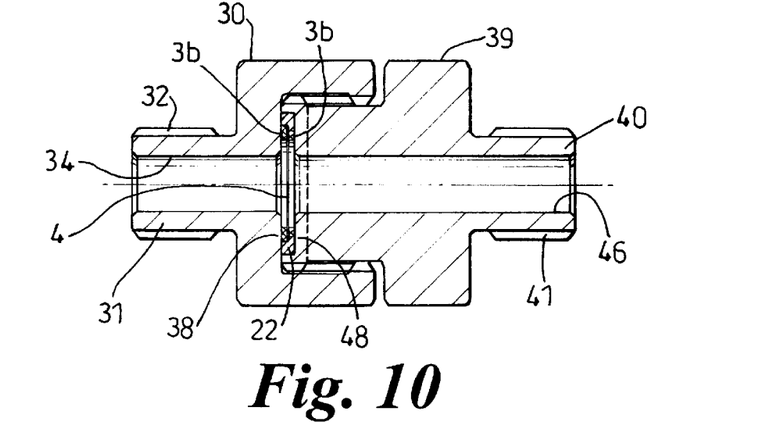
FIG. 10 is a longitudinal sectional view of the assembled adaptor assembly of FIG. 9.
Figure 11:
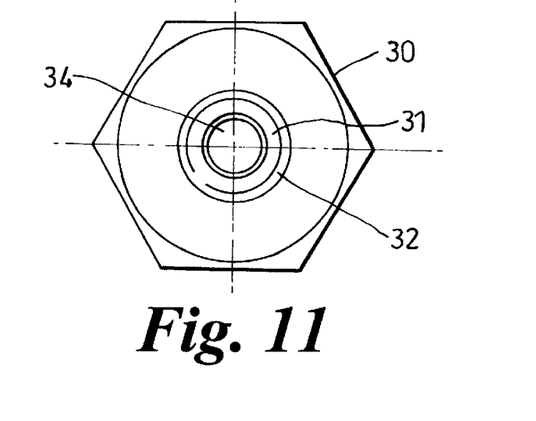
FIG. 11 is an end view of the adaptor shown in FIGS. 9 and 10.

Referring now to FIGS. 9 to 11, the combined seal 1 and filter 2 of FIGS. 4 to 6 is shown in an assembly including an adaptor 27 for mounting the seal 1 and filter 2 in a fluid line. The adaptor 27 comprises first and second parts 28,29 arranged to be threadably engaged to locate and retain the seal 1 and filter 2 therebetween.

The first part 28 has a hexagonal body portion 30 at one end for engagement by a spanner or like tool to rotate the body portion 30 during assembly and an annular spigot portion 31 at the other end.

The spigot portion 31 has an external screw thread 32 for threaded engagement with a complementary threaded internal bore (not shown) of the fluid line on which the adaptor 27 is installed. Alternatively, the spigot portion 31 may have an internal screw thread for engagement with an external screw thread of the fluid line. The screw thread 32 terminates on an external shoulder 33.

For some applications, the shoulder 33 may provide a stop face to limit threaded engagement of the spigot portion 31 in the bore of the fluid line. In this case, the shoulder 33 may be provided with a seal (not shown).

The spigot portion 31 is formed with a cylindrical bore 34 corresponding to the bore of the fluid line and opening to an enlarged counterbore 35 defining a socket 36 in the body portion 29.

The counterbore 35 is formed with an internal screw thread 37 terminating in an internal shoulder providing an abutment face 38 for the sealing portion 3b of the seal 3 on one side of the filter 2.

The second part 29 has a hexagonal body portion 39 intermediate the ends for engagement by a spanner or like tool to rotate the body portion 39 during assembly.

An annular spigot portion 40 similar to the spigot portion 31 of the first part 28 is provided at one end and has an external screw thread 41 for threaded engagement with a complementary threaded bore (not shown) of the fluid line in which the adaptor 27 is installed. Alternatively, the spigot portion 40 may have an internal screw thread for engagement with an external screw thread of the fluid line. The screw thread 41 terminates in an external shoulder 42. In some applications, the shoulder 42 may provide a stop face to limit threaded engagement of the spigot portion 40 in the bore of the fluid line. In this case, the shoulder 42 may be provided with a seal (not shown).

A further annular spigot portion 43 is provided at the other end defining a male plug 44 with an external screw thread 45 complementary to the internal screw thread 37 of the counterbore 35 defining the female socket 36 in the first part 28.

The second part 29 has a cylindrical through bore 46 matching the bore 34 in the first part 28 and corresponding to the bore of the fluid line. The bores 34, 46 define a fluid passageway through the assembled adaptor 27.

The spigot portion 43 is formed with an annular counterbore 47 in the end face sized to receive the support member 22 to locate the seal 1 and filter 2 transverse to the passageway. The counterbore 47 provides an abutment face 48 for the sealing portion 3b of the seal 3 on the other side of the filter 2.

The diameter of the counterbore 47 is slightly larger than the diameter of the support member 22 and the depth of the counterbore 47 is slightly smaller than the thickness of the support member 22. In this way, the support member 22 is a close fit in the counterbore 47 and projects from the counterbore 47.

In use of the adaptor 27 to install the combined seal 1 and filter 2 in a fluid line, the support member 22 is located in the counterbore 47 at the end of the spigot portion 43 of the second part 29. The sealing portion 3b of the seal ring 3 on one side of the mesh 4 contacts the abutment face 48 and the support member 22 projects from the counterbore 47.

The external thread 44 of the spigot portion 43 is then screwed into in engagement with the internal thread 37 of the counterbore 35 in the first part 28. On initial tightening, the parts 28,29 are brought together axially so that the sealing portion 3b of the seal ring 3 on the other side of the mesh 4 contacts the opposed abutment face 38 of the first part 28.

On further tightening, the seal portions 3b are compressed due to the axial forces applied and the support member 22 is urged into the counterbore 47 until the seal ring 3 is substantially flush with the support member 22.

In this condition, the support member 22 projects slightly from the counterbore 47 and is firmly clamped between the abutment faces 38,48 with the sealing portions 3b compressed against the abutment faces 38,48 to seal completely the filter 2 in the adaptor 27. In this way, the filter 2 is positioned transverse to the fluid passageway and is sealed on both sides to prevent leakage of fluid.

As will now be understood, the adaptor 27 ensures accurate location and facilitates installation of the filter 2 in a fluid line transverse to the direction of fluid flow in a simple and effective manner that also facilitates access to the filter 2 for cleaning, repair or replacement during routine maintenance and/or in an emergency.

In the above-described embodiment, the support member 22 limits compression of the seal 1 in the assembled adaptor 27. It will be understood, however, that the support member 22 may be omitted and the filter 2 with integral seal 1 mounted in the counterbore 47 so that compression of the seal 1 is controlled by engagement of the parts 28,29.

Figure 12:
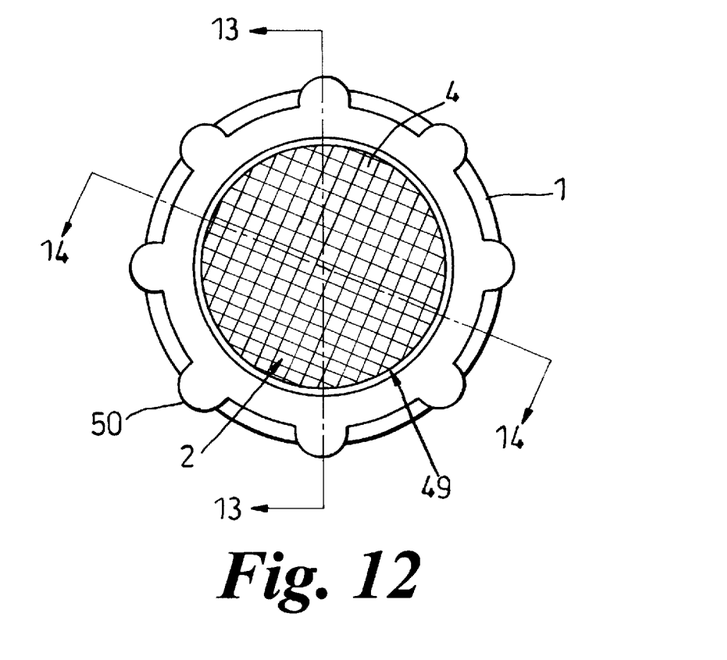
FIG. 12 is an end view of a combined seal and filter according to a third embodiment of the invention.
Figure 13:
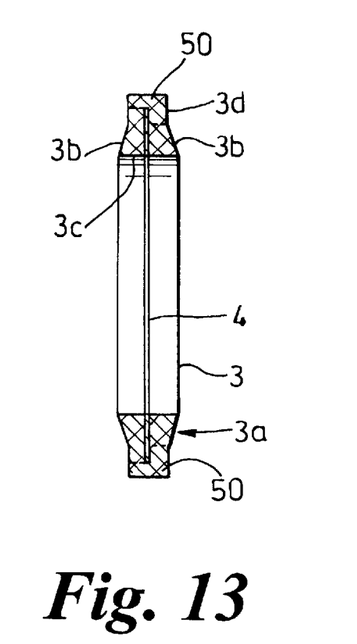
FIG. 13 is a section on the line 13—13 of FIG. 12.
Figure 14:
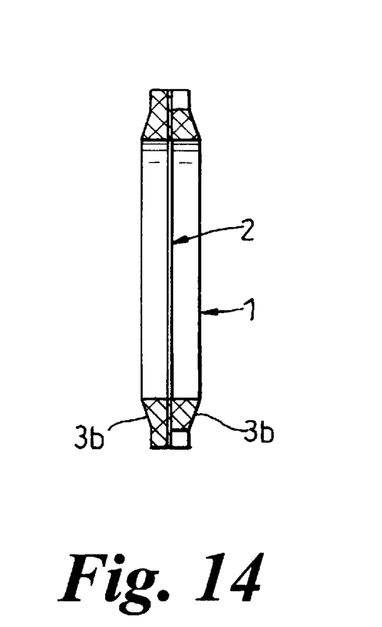
FIG. 14 is a section on the line 14—14 of FIG. 12.

Referring now to FIGS. 12 to 14, there is shown a third embodiment of combined seal 1 and filter 2 similar to that shown in FIGS. 4 to 6 but with the outer support plate 22 omitted. The crease line for preventing penetration of the seal material to the centre region of the mesh 4 is indicated by reference numeral 49.

This embodiment may be produced by moulding the seal 1 onto the filter 2 in a mould containing the support plate 22 without any bonding agent being applied so that the seal 1 does not bond the support plate 22. As a result, the combined seal 1 and filter 2 can be separated from the support plate 22 on completion of moulding. In this way, the same mould can be used to make the combined seal 1 and filter 2 with or without the additional reinforcement provided by the support plate 22 depending on the intended application of the seal 1 and filter 2.

As will be appreciated, when the seal 1 and filter 2 are separated from the support plate 22, the notches 25 provided in the support plate 22 produce a series of outwardly projecting lobes 50 uniformly spaced apart around the outer peripheral edge of the seal 1. These lobes 50 assist in locating and centering the seal 1 and filter 2 when installed in a fluid line, particularly when the seal 1 and filter 2 are received in a counterbore having a diameter corresponding to the maximum diameter of the seal 1. Thus, variations in the dimensions of the counterbore such as may occur through manufacturing tolerances are accommodated by deformation of the lobes 50 in a manner that would not be possible if the lobes 50 were omitted. As will be appreciated, the number and position of lobes 50 may be varied from that shown although a symmetrical arrangement is generally preferred for centering the seal 1 and filter 2.

Figure 15:
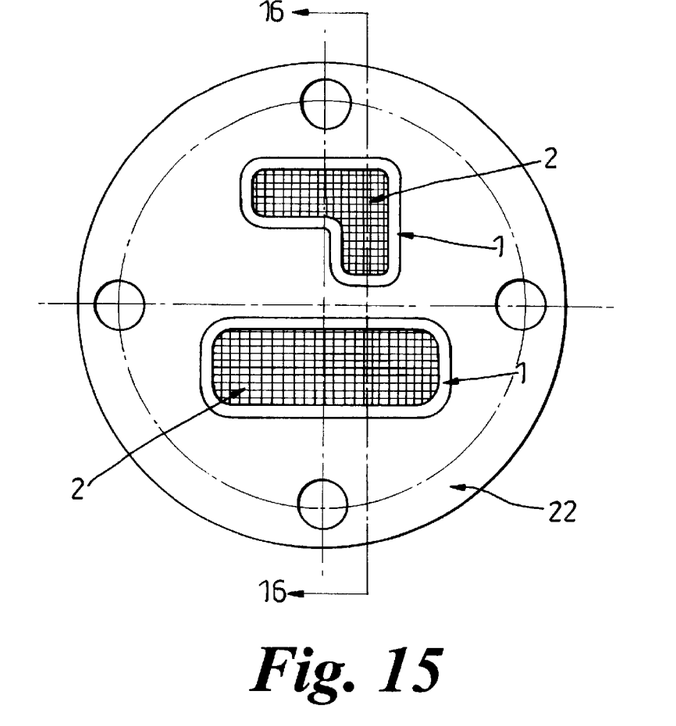
FIG. 15 is end view of a twin seal and filter arrangement according to a fourth embodiment of the invention.
Figure 16:
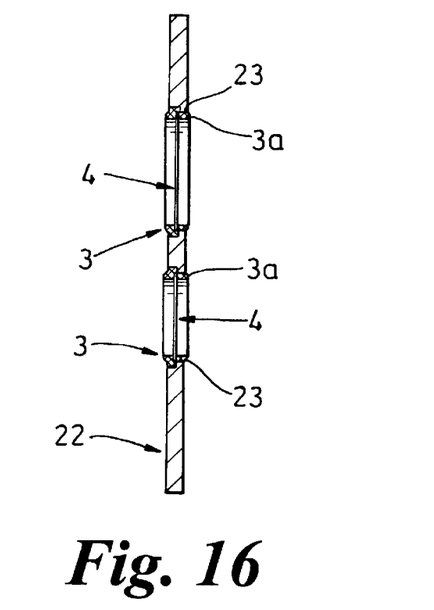
FIG. 16 is a section on the line 16—16 of FIG. 15.

Referring now to FIGS. 15 and 16, a twin seal 1 and filter 2 arrangement is shown mounted in a common support plate 22 for sealing two joints. As shown, one seal 1 and filter 2 is of L-shape and the other is of rectangular shape with the plate 22 having holes 23 of matching shape. The materials and method of forming each seal 1 and filter 2 are similar to the second embodiment with each seal ring 3 having an inner portion 3a of trapezoidal shape. Other shapes and configurations of seal 1 and filter 2 and/or plate 22 may be employed to suit the joint to be sealed. Furthermore, it will readily be appreciated that by providing more than one seal 1 and filter 2 in a common plate 22, several joints can be sealed using a single component thereby facilitating installation, for example when connecting a number of fittings to a hydraulic block.

It will be understood that the invention is not limited to the embodiments above-described. For example, the seal 1 may be made of any suitable elastomer or resilient plastics capable of sealing when compressed. The seal ring 3 may be of circular or non-circular cross-section. A section which reduces the stress on the bond between the seal 1 and filter 2 when the seal 1 is compressed is generally preferred such as the trapezoidal section shown in some of the exemplary embodiments. The filter 2 may be made of metal or plastics and the centre region may be flat or dome-shaped to increase the area of the filter.

The combined seal 1 and filter 2 may be of annular shape or any other suitable shape, for example oval, elliptical, rectangular, L-shape, T-shape or the like depending on the cross-section of the passageway to be sealed.

Where provided, the support plate 22 may be made of metal or plastics and may be flat or any other suitable shape for locating between the opposed faces of the components forming the joint to be sealed. The support plate 22 may be of annular shape or any other suitable shape. The support plate 22 may be provided with means to indicate the orientation for installation of the seal 1 and filter 2 in a fluid line. The indicator means may be a mark, letter, numeral or other suitable indicia for establishing the correct way to fit the support plate 2. More than one seal 1 and filter 2 may be provided in the same support plate 22 depending on the number and arrangement of the joints to be sealed. Where the support plate 22 is omitted, the seal 1 may be formed at the outer edge with one or more outwardly projecting lobes 50 or similar formation(s). Other modifications will be apparent to these of ordinary skill in the art.

Finally, it will be understood that the invention includes any feature or combination of features described herein and the scope of the invention is to be construed accordingly.

We claim:

1. An integral seal and filter assembly for a fluid line comprising:

a seal bonded to a peripheral edge region of a filter, said seal having a substantially trapezoidal cross-section and including resilient sealing portions on opposite sides of said filter, said seal having a first and a second axial face on opposite sides of said filter assembly and being substantially convergent in a radial direction from an inner diameter towards an outer diameter of said filter assembly, wherein said inner diameter is substantially flat in an uncompressed condition of said seal and substantially concave in a compressed condition, and wherein said sealing portions are compressible between opposed faces of substantially axially movable components to form a seal therebetween with said filter extending across a fluid passageway through the components.

2. The assembly according to clam 1 wherein, said filter has a barrier separating said peripheral edge region from a centre region for confining said seal to said peripheral edge region.

3. An assembly according to claim 2 wherein said filter comprises a mesh screen and said barrier comprises a crease formed by crushing a narrow region of said mesh inwardly of said peripheral edge region.

4. An assembly according to claim 2 wherein said filter comprises a mesh screen having an array of perforations formed by photochemical machining a preform and said barrier comprises a region free from perforations formed by masking said preform during said machining operation.

5. An assembly according to claim 1 wherein said seal is made of elastomer and said filter is made of metal.

6. An assembly according to claim 1 wherein an outer support member is provided for said seal and filter.

7. An assembly according to claim 6 wherein said outer support member comprises a plate having a hole for reception of said seal and filter, said hole has a counterbore providing a shoulder for locating said peripheral edge of said filter with said seal covering said peripheral edge, and said seal projects outwardly from said plate on both sides and is bonded to a marginal edge of said hole.

8. An assembly according to claim 1, wherein said first and second axial faces converge inwardly toward each other.

9. A method of forming an integral seal and filter assembly comprising the steps of:

providing a filter, bonding a seal to a marginal edge portion of said filter, said seal having a substantially trapezoidal cross-section in an uncompressed condition with a substantially flat inner diameter, a first and a second axial face on opposite sides of said filter assembly and that are substantially convergent in a radial direction from said inner diameter towards an outer diameter of said filter assembly, and compressing said sealing portions to form a seal between substantially axially movable components such that said inner diameter is compressed into a substantially concave shape.

10. The method according to claim 9 wherein, said seal is confined to said marginal edge of said filter by providing said filter with a barrier.

11. The method according to claim 9 wherein, an outer support member is provided having a hole for reception of said seal and filter assembly, and said seal is bonded to a marginal edge of said hole.

12. The method according to claim 11 wherein, said seal has a sealing portion of trapezoidal section inwardly of said hole with sealing surfaces projecting from said support member on each side and convergent from an inner edge of said seal towards said support member.

13. An integral seal and filter assembly comprising:

a seal having a central opening, said seal having a substantially trapezoidal cross-section and including a substantially flat inner diameter in an uncompressed condition of said seal, the seal having side walls extending outwards from opposite ends of said inner diameter, said side walls being substantially convergent in a radial direction away from said inner diameter towards an outer diameter of said filter assembly, wherein said inner diameter is substantially concave in a compressed condition, and a filter extending across said central opening and having a marginal edge portion bonded to said seal between said side walls.

* * * * *